US009273635B2

(12) United States Patent
Brady et al.

(10) Patent No.: US 9,273,635 B2
(45) Date of Patent: Mar. 1, 2016

(54) HYPERGOLIC HYBRID MOTOR IGNITER

(75) Inventors: Brian Blaise Brady, Seal Beach, CA (US); John D DeSain, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 1008 days.

(21) Appl. No.: 13/434,223

(22) Filed: Mar. 29, 2012

(65) Prior Publication Data
US 2013/0255223 A1 Oct. 3, 2013

(51) Int. Cl.
*F02K 9/72* (2006.01)

(52) U.S. Cl.
CPC .......................................... *F02K 9/72* (2013.01)

(58) Field of Classification Search
CPC ............. F02K 9/72; F02K 9/763; F02K 9/76; F02K 9/94; F02K 9/95; F02K 9/08
See application file for complete search history.

(56) References Cited

U.S. PATENT DOCUMENTS

| | | | | |
|---|---|---|---|---|
| 2,857,736 A | * | 10/1958 | Carmody et al. | 60/211 |
| 2,935,846 A | * | 5/1960 | Neale et al. | 60/39.48 |
| 3,153,902 A | * | 10/1964 | Morrell | 60/215 |
| 3,181,982 A | * | 5/1965 | Burnside et al. | 149/19.3 |
| 3,217,489 A | * | 11/1965 | King et al. | 60/224 |
| 3,315,472 A | * | 4/1967 | Moutet | F02K 9/72 60/251 |
| 3,677,011 A | * | 7/1972 | Vickland | F02K 9/72 60/220 |
| 3,712,058 A | * | 1/1973 | Cooper | 60/207 |
| 3,777,490 A | * | 12/1973 | Weber | F02K 9/44 60/258 |
| 3,811,358 A | * | 5/1974 | Morse | 86/20.1 |
| 5,133,183 A | * | 7/1992 | Asaoka et al. | 60/204 |
| 5,582,001 A | * | 12/1996 | Bradford | F02K 9/72 60/207 |
| 5,715,675 A | * | 2/1998 | Smith et al. | 60/251 |
| 5,794,435 A | * | 8/1998 | Jones | 60/251 |
| 6,073,437 A | * | 6/2000 | Jones | 60/204 |
| 6,845,605 B1 | * | 1/2005 | Taylor et al. | 60/39.824 |
| 6,912,839 B2 | * | 7/2005 | Kline et al. | 60/251 |
| 2013/0205751 A1 | * | 8/2013 | Joshi | C06C 9/00 60/213 |

OTHER PUBLICATIONS

John D. Desain et al., "Testing Hypergolic Ignition of Paraffin Wax/LiAlH4 Mixtures with Nitric Acid," Aerospace Report No. ATR-2008 (8268)-1, Jun. 20, 2008.
John D. Desain et al., "Testing Hypergolic Ignition of Parraffin Waz LiAlH4 Mixtures: Part 2," Aerospace Report No. ATR-2009 (8268)-2, Feb. 25, 2009.
John D. Desain et al., "Hypergolic Ignition of a Parraffin Wax/Gaseous O2 Hybrid Rocket Test Motors." Aerospace Report No. ATR-2011 (8402)-1, Feb. 25, 2011.
John D. Desain et al., "Hypergolic Ignition of Parraffin Wax.LiAlH4 Mini-Test Motors," Aerospace Report ATR-2009 (8268)-3, May 20, 2009.
John D. Desain et al., "Testing of LiAlH4 as a Potential Additive to Paraffin Wax Hybrid Rocket Fuel," Aerospace Report No. ATR-2008 (8506)-1, Oct. 30, 2007.

* cited by examiner

*Primary Examiner* — Phutthiwat Wongwian
*Assistant Examiner* — Carlos A Rivera
(74) *Attorney, Agent, or Firm* — Leonard Patel PC

(57) ABSTRACT

An apparatus for igniting a larger rocket motor is provided. The apparatus may be a smaller rocket motor that can be ignited hypergolically, when a pressurized oxidizer contacts hypergolic fuel grains of the smaller rocket motor. The hypergolic ignition causes the larger rocket motor to be ignited. The hypergolic ignition of the smaller rocket motor may be stopped after the larger rocket motor is ignited, and the remaining hypergolic fuel grains and the pressurized oxidizer can be reserved for reigniting the larger rocket motor at a later time.

18 Claims, 3 Drawing Sheets

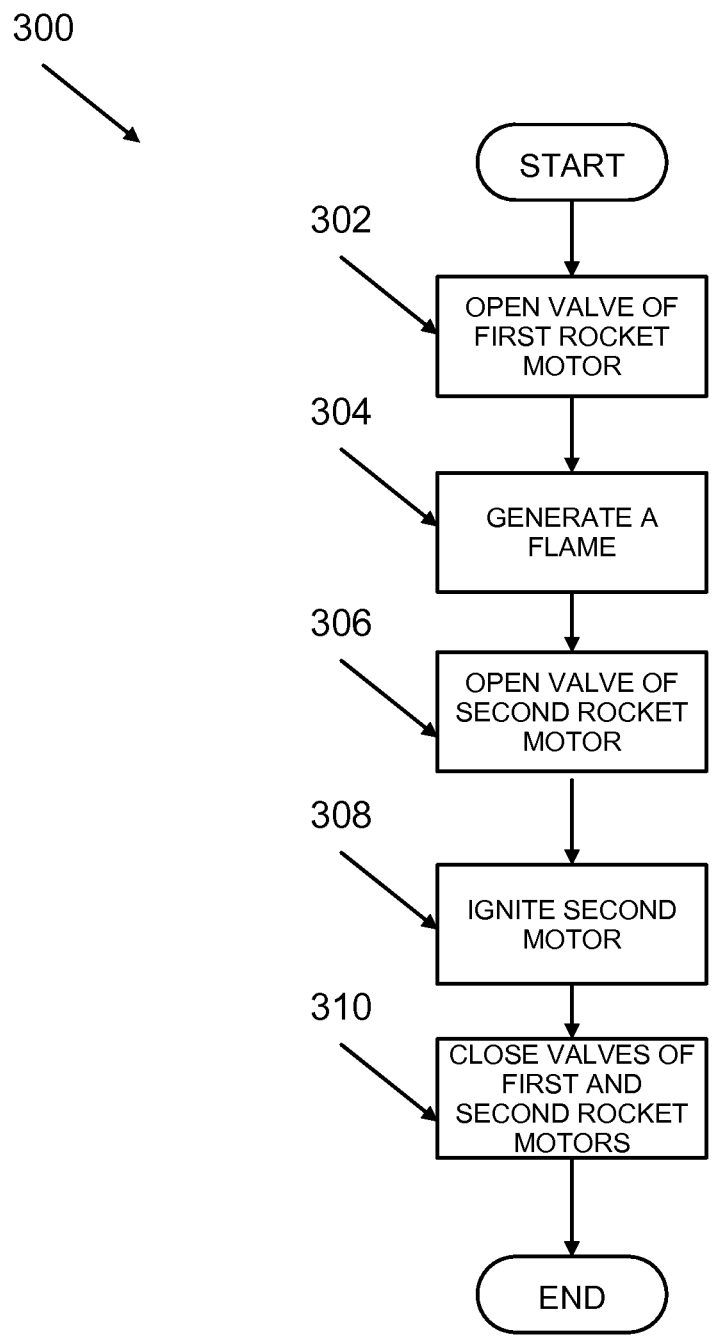

HYPERGOLIC HYBRID MOTOR IGNITER

FIELD

The present invention relates to rocket motors and, more particularly, to a hybrid rocket motor used to ignite and reignite a larger rocket motor.

BACKGROUND

Generally, conventional solid propellant rocket motors have their fuel and oxidizers premixed. These rocket motors are ignited often by explosive squibs. These solid propellants rocket motors may only be ignited once and cannot be extinguished and restarted for later use during the launch process. Another common rocket motor is an all liquid propellant motors such as liquid hydrogen and liquid oxygen motors. These rocket motors may be extinguished and restarted, but need to utilize an external ignition source. These sources add complexity to the motor and can be bulky, thus making the rocket motor inefficient.

Hybrid rocket motors utilize solid fuel and either gaseous or liquid oxidizers. These motors have a combination of features that make solid rocket motors attractive for reasons of simplicity, but like all liquid rocket motors these motors may be extinguished and restarted.

As stated above, rocket motors need to be ignited. Most solid propellant motors use a one use explosive squib. All liquid and hybrid propellant motors often use electric matches, squibs or spark igniters with/or without a combination of a secondary gas flame. The squib systems can only be restarted if the squib is replaced, which is generally not possible for upper stages that are already in flight. External flame sources may be possible on upper stages, but these sources add weight. External flame sources also need to be ignited and have to carry additional spark igniters to ignite these flames. This adds weight and complexity to the system. Hypergolic propellants may overcome this problem, but current hypergolic propellants are toxic and the choice of using hypergolic propellants limits performance and choice of oxidizer and fuel.

SUMMARY

Certain embodiments of the present invention may provide solutions to the problems and needs in the art that have not yet been fully identified, appreciated, or solved by current hybrid rocket motors and upperstage all liquid motors. For instance, a hypergolic rocket motor may be utilized to start and restart a larger rocket motor. The hypergolic rocket motor may include hypergolic fuel grains, which ignite spontaneously upon contact with an oxidizer, to provide a simple and reliable mechanism to start and restart the larger rocket motor.

In accordance with an embodiment of the present invention, an apparatus is provided. The apparatus includes hypergolic fuel grains that form a chamber and an oxidizer valve that allows a pressurized oxidizer to enter the chamber. The hypergolic fuel grains may cause an ignition of a larger rocket motor upon contact with the pressurized oxidizer.

In another embodiment of the present invention, an apparatus is provided. The apparatus includes a first and a second rocket motor. The first rocket motor includes hypergolic fuel grains. The second rocket motor is operatively connected to the first rocket motor such that the first rocket motor can ignite, and reignite at a later time, the second rocket motor.

In yet another embodiment of the present invention, a hybrid rocket motor is provided. The hybrid rocket motor includes hypergolic fuel grains that form a chamber, and is connected to a chamber of the larger rocket motor. The hypergolic fuel grains may ignite the larger rocket motor when a pressurized oxidizer is released into the chamber formed by the hypergolic fuel grains.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 illustrates a method for igniting a second rocket motor using a first rocket motor, in accordance with an embodiment of the present invention.

DETAILED DESCRIPTION OF THE EMBODIMENTS

Figure 1:
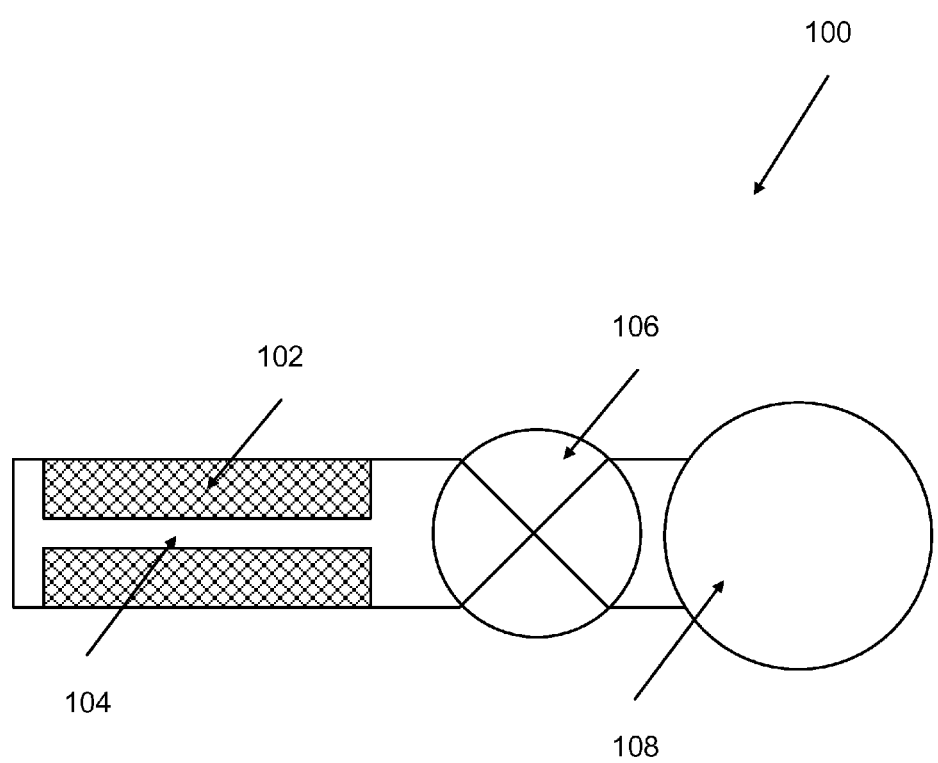
FIG. 1 illustrates hybrid rocket motor, in accordance with an embodiment of the present invention.

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

Hybrid rocket motors may have advantages of both solid and liquid-fueled rocket motors, while avoiding some of the disadvantages of each fuel type. For example, hybrid rocket motors may have a higher performance than solid propellants, and in many instances, are more environmentally benign. Hybrid rocket motors may also be safer because the fuel and oxidizer are kept separate, and thus the rocket can be shut down in case of the need to abort the launch. These advantages may also be shared with liquid propellant rocket motors.

Hybrid rocket motors may also retain some of the advantages of solid propellant rocket motors, such that they are simpler than liquids. For instance, solid fuel grains may be stored indefinitely. Also, only one propellant tank and one propellant management system may be required (for the oxidizer) in some embodiments to reduce the number of parts and complexity of the system.

Hypergolic ignition reduces the complexity of these rockets by eliminating the need for a separate ignition system. Due to the elimination of the separate ignition system, the weight and complexity of the ignition system may also be saved. Also, hypergolic ignition is more reliable than conventional ignition systems because hypergolic ignition is not dependent on timing of a spark or other ignition energy relative to the flow of the propellants. Hypergolic ignition in a hybrid rocket motor may be simpler and more reliable than hypergolic ignition in liquid bipropellant engines because it is not dependent on timing of the flows of the propellant.

One or more embodiments of the present invention allow ignition of a rocket motor, or a hybrid rocket motor, using a small hypergolic hybrid motor with paraffin-based fuel grains for the ignition system. In some embodiments, propellant grains may be cast from melted paraffin with solid particles of lithium aluminum hydride (LiAlH$_4$) suspended in the paraffin. The grains may be formed into a motor when included with a nitric acid oxidizer pressurized with oxygen, for example. The small hypergolic rocket motor may be attached to a larger rocket motor in place of an igniter system. By adding hypergolic features to the small hybrid motor, added weight needed for the hydrocarbon gas may be eliminated and restart abilities may be retained. It should be appreciated that the hypergolic rocket motor may be utilized to ignite any potential hybrid or non-hybrid rocket motor design. The hypergolic fuel and oxidizer may be separate from the igniter motor, and the igniter motor may be stored separately or cast immediately prior to use to avoid degradation.

FIG. 1 illustrates a hybrid rocket motor 100, in accordance with an embodiment of the present invention. In this embodiment, hybrid rocket motor 100 may be a reusable small hypergolic hybrid motor with paraffin-based fuel grains for an ignition system. Hybrid rocket motor 100 may be used to replace the igniter system of a rocket. For example, hybrid rocket motor 100 may be operatively connected to a rocket in order to ignite the larger rocket motor. See, for example, FIG. 2.

Hybrid rocket motor 100 may include hypergolic fuel grains 102 to form a chamber 104 and an oxidizer valve 106. Hypergolic fuel grains 102, which ignite spontaneously upon contact with a pressurized oxidizer, provide a simple and reliable mechanism to start and restart a larger rocket motor. Hypergolic fuel grains 102 may be comprised of paraffin wax and/or low density polyethylene (LDPE) wax with one or more of the following: lithium aluminum hydride (or similar metal hydride), triethyl aluminum, disobutyl aluminum hydride, sodium bis (2-methoxyethoxy) aluminum hydride, and triethyl borane. Metal hydrides may include, for example, sodium borohydride, lithium borohydride, sodium aluminum hydride, magnesium hydride, and lithium hydride.

Hybrid rocket motor 100 may also include pressurized oxidizer storage 108. Pressurized oxidizer storage 108 may include one or more of the following pressurized oxidizers in some embodiments: nitric acid, hydrochloric acid, sulfuric acid, red fuming nitric acid, and inhibited red fuming nitric acid. The inhibited red fuming nitric acid may be used with or without a helium oxygen He/O$_2$ blow down tank, and/or with or without a heater. When oxidizer valve 106 is open (or turned on), the pressurized oxidizer from pressurized oxidizer storage 108 may enter chamber 104, and upon contact with hypergolic fuel grains 102, generate a flame to start or restart the larger rocket motor.

While FIG. 1 illustrates a hybrid rocket motor 100, in other embodiments, the motor may be any type of motor other than a hybrid rocket motor and may be configured to ignite other types of motors, such as liquid-liquid motors, solid motors, etc.

Figure 2:
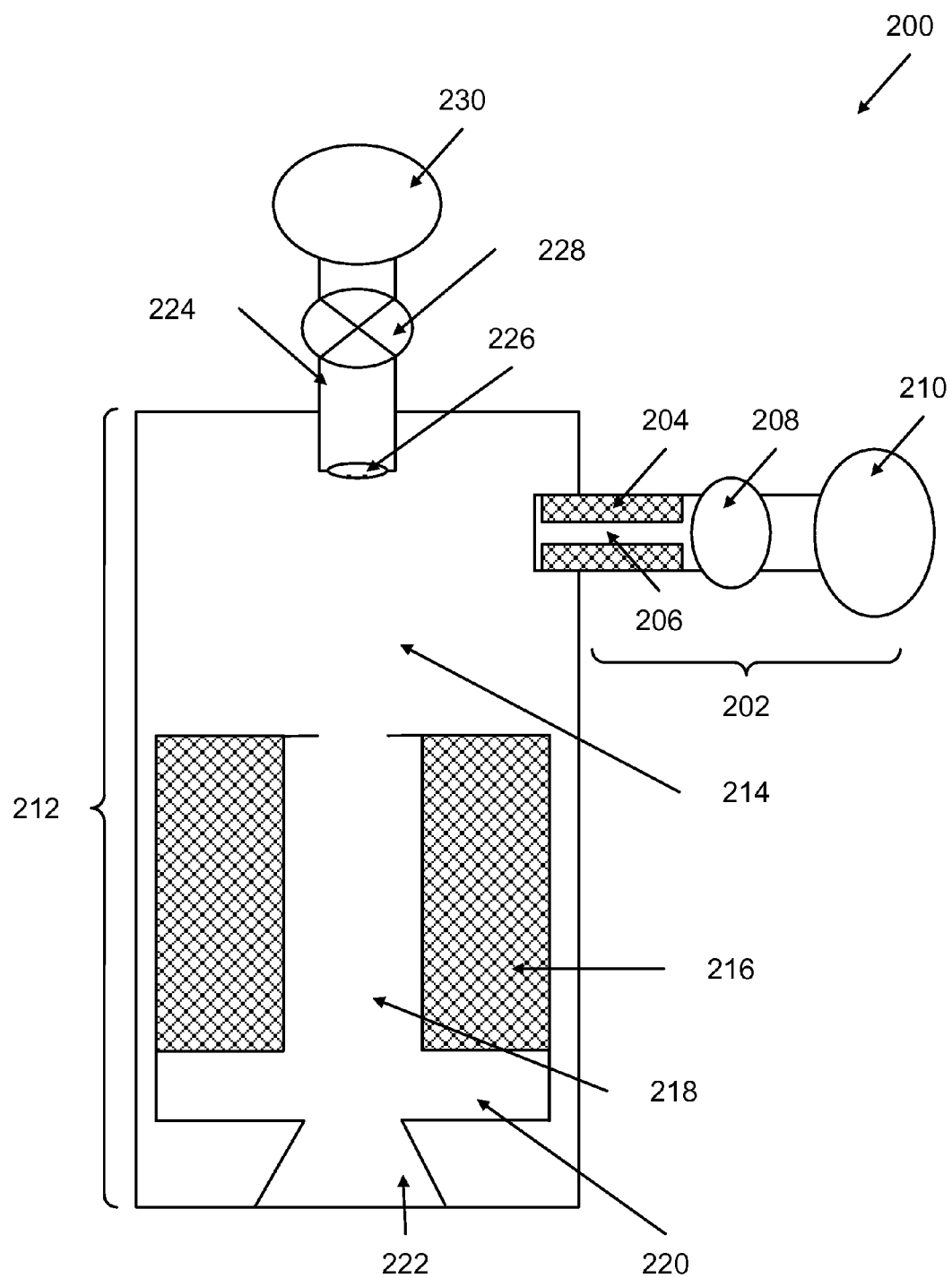
FIG. 2 illustrates a rocket motor system that uses a first rocket motor to ignite a second rocket motor, in accordance with an embodiment of the present invention.

FIG. 2 illustrates a rocket motor system 200 that uses a first rocket motor 202 to ignite a second rocket motor 212, in accordance with an embodiment of the present invention. Even though FIG. 2 illustrates a single rocket motor (e.g., first rocket motor 202), there may be more than one of these smaller rocket motors to ignite a second, or much larger, rocket motor 212, depending on the design of rocket motor system 200. Second rocket motor 212 may be a hybrid rocket motor, a non-hypergolic hybrid rocket motor, or all liquid rocket motor, or any rocket motor that may be appreciated by a person of ordinary skill in the art.

In this embodiment, first (or smaller) rocket motor 202 may include hypergolic fuel grains 204 to form a chamber 206, an oxidizer valve 208, and pressurized oxidizer storage 210. First rocket motor 202 may be utilized to initially ignite second rocket motor 212 to allow the rocket to achieve lower earth orbit (LEO), and at a later time reignite second rocket motor 212 to allow the rocket to achieve geostationary earth orbit (GEO). For example, when oxidizer valve 208 is open, a pressurized oxidizer may be introduced into chamber 206. It should be appreciated that in order to pressurize the oxidizer that is introduced in chamber 206, a small amount of pressure from pressurized oxidizer chamber 230 may be used (not shown). Pressurized oxidizer storage (or oxidizer storage tank) 210 may use common internal propellant management systems such as roll bladders. When the pressurized oxidizer enters chamber 206 and contacts hypergolic fuel grains 204, a flame may be produced in pre-combustion chamber 214 of second rocket motor 212. In another embodiment, an additional oxidizer valve may be added to allow a small oxidizer flow from chamber 230 into chamber 206 when long burns of hypergolic fuel grain 204 are desired.

When the flame from first rocket motor 202 is produced in pre-combustion chamber 214, oxidizer valve 228 may be opened in order to introduce a pressurized oxidizer from pressurized oxidizer storage 230 in to pre-combustion chamber 214. Pressurized oxidizer storage 230 may include oxygen, nitrogen tetroxide, nitric acid, nitrous oxide, and/or mixture of nitrous oxide and oxygen. The pressurized oxidizer may be introduced through an injector 226 that operatively connects pre-combustion chamber 214 with oxidizer chamber 224. Injector 226 may be a sprinkler, a straight hole, a swirl injector, or a lithographic induced injector with or without a propellant management device.

As the pressurized oxidizer from the pressurized oxidizer chamber 230 mixes with the flame from first rocket motor 202, a larger flame may be created that ignites second rocket motor 212 to power the rocket. For example, when the mixture of the pressurized oxidizer and the flame contacts fuel grains 216, a larger flame may be produced in post combustion chamber 220 to ignite second rocket motor 212.

In this embodiment, second rocket motor 212 may include pre-combustion chamber 214, fuel grains 216 that form an oxidizer channel (or chamber) 218, post combustion chamber 220, and a nozzle 222. Fuel grains 216 may be paraffin wax-based fuel grains, rubber-based fuel grains, polyethylene-based fuel grains, or lithography-based fuel grains, with or without energetic additives. In some embodiments, second rocket motor 212 could potentially be the combustion chamber of an all liquid motor.

Because first rocket motor 202 may be reused to reignite second rocket motor 212 at a later time during flight, the flame created by first rocket motor 202 may be extinguished when oxidizer valve 208 is closed. A person of ordinary skill in the art would appreciate that, when the pressurized oxidizer is no longer in contact with hypergolic fuel grains 206, the flame is extinguished due to the lack of reactive binary materials (i.e., for hypergolic ignition, the fuel grains and the pressurized oxidizer must both be present). This allows first rocket motor 202 to retain the pressurized oxidizer to be used at a later time to reignite second rocket motor 212. Simultaneously or sequentially, oxidizer valve 228 may also be closed to retain the pressurized oxidizer in pressurized oxidizer storage 230.

In order to reignite second rocket motor 212 at a later time during flight, oxidizer valve 208 is reopened to allow the pressurized oxidizer to flow into chamber 206, and upon contact with hypergolic fuel grains 204, produce a flame in pre-combustion chamber 214. When oxidizer valve 228 is reopened, the pressurized oxidizer from pressurized oxidizer storage 230 is re-introduced to the flame from first rocket motor 202. The mixture of the flame and the pressurized oxidizers flow into chamber 218, and upon contact with fuel grains 216, reignite second rocket motor 212.

It should be appreciated that first rocket motor 202 may be utilized for any type of rocket motor and is not limited to a hybrid rocket motor. Further, first rocket motor 202 may be attached to second rocket motor 210 in place of an igniter system.

FIG. 3 illustrates a method 300 for igniting a second rocket motor using a first rocket motor, in accordance with an embodiment of the present invention.

At 302, a valve of the first rocket motor (or smaller rocket motor) is opened such that a pressurized oxidizer enters a chamber formed by hypergolic fuel grains. A flame is generated (or produced) at 304 when the pressurized oxidizers contact the hypergolic fuel grains. At 306, a valve of the second rocket motor is open such that pressurized oxidizers may be combined with the flame. At 308, the second rocket motor is ignited when the mixture of the pressurized oxidizer and the flame contact fuel grains of the second rocket motor. At 310, the valve of the first rocket motor is closed in order to extinguish the flame generated by the first rocket motor, and the valve of the second rocket motor is also closed once the second rocket motor has been ignited. It should be appreciated that depending on the design of the system, in some embodiments, the flame may be extinguished less than a second after the flame is generated in the pre-combustion chamber, as the ignition of the second rocket motor may take less than a second.

Some embodiments of the present invention pertain to a small hybrid rocket motor utilized as an igniter for a larger rocket motor. The small rocket motor may be ignited hypergolically. Hypergolic ignition of the small hybrid rocket motor using paraffin-based fuel grains may be achieved by the addition of nitric acid under flowing oxygen, for example. The paraffin-based fuel grains may contain lithium aluminum hydride as an additive. The use of hypergolic ignition generally allows the hybrid rocket motor to be simpler, and more reliable, while saving the weight of a conventional ignition system.

Further, by using the small hybrid rocket motor to ignite the larger rocket motor, a small quantity of reactive chemicals may be required, and a wide range of designs, including internal ballistics and injector designs, can be realized. Also, wide variety of fuels can be used in the larger rocket motor. The small hybrid rocket motor may be stopped after the larger rocket motor is ignited, and the remaining hypergolic fuel grains and oxidizer may be reserved to restart the larger rocket motor at a later time.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
    hypergolic fuel grains configured to form a chamber coupled to a first inlet of a pre-combustion chamber of a larger rocket motor;
    an oxidizer valve configured to allow a pressurized oxidizer to enter the chamber, and upon contact with the hypergolic fuel grains, burn the hypergolic fuel grains to generate a flame in the pre-combustion chamber; and
    an injector configured to inject the pressurized oxidizer through a second inlet of the pre-combustion chamber; wherein
    the hypergolic fuel grains are configured to cause an ignition of the larger rocket motor upon contact with the pressurized oxidizer by mixing the flame with the pressurized oxidizer injected by the injector through the second inlet, and
    when the oxidizer valve is closed, the pressurized oxidizer is prevented from entering the chamber and the hypergolic fuel grains are extinguished from burning.

2. The apparatus of claim 1, wherein the hypergolic fuel grains comprise paraffin wax, low-density polyethylene, or both.

3. The apparatus of claim 2, wherein the paraffin wax, the low density polyethylene, or both, comprise one or more of lithium aluminum hydride or metal hydrides, triethyl aluminum, disobutyl aluminum hydride, sodium bis aluminum hydride, or triethyl borane.

4. The apparatus of claim 1, wherein the pressurized oxidizer comprises one or more of nitric acid, hydrochloric acid, sulfuric acid, red fuming nitric acid, hydrogen peroxide or inhibited red fuming nitric acid.

5. The apparatus of claim 1, wherein, when the oxidizer valve is closed, a flow of the pressurized oxidizer is prevented from entering the chamber such that the hypergolic fuel grains are prevented from producing the flame to ignite the larger rocket motor.

6. The apparatus of claim 1, wherein, when the oxidizer valve is opened during initial operation or during subsequent operation of the apparatus, the pressurized oxidizer flows into the chamber and the hypergolic fuel grains are further configured to produce, upon contact with the pressurized oxidizer, the flame to ignite or reignite the larger rocket motor.

7. An apparatus, comprising:
    a first rocket motor comprising hypergolic fuel grains configured to receive a pressurized oxidizer and coupled to a first inlet of a pre-combustion chamber of a second rocket motor; and
    an injector configured to inject the pressurized oxidizer through a second inlet of the pre-combustion chamber, wherein
    the first rocket motor is configured to ignite, and reignite at a later time, the second rocket motor by generating a flame in the re-combustion chamber and by mixing the flame with the pressurized oxidizer injected by the injector through the second inlet, and
    the flame is generated when the hypergolic fuel grains burn upon contact with the received pressurized oxidizer, and extinguish from burning when the pressurized oxidizer is prevented from contacting the hypergolic fuel grains.

8. The apparatus of claim 7, wherein the first rocket motor further comprises a valve.

9. The apparatus of claim 8, wherein, when the valve is opened, a pressurized oxidizer enters a chamber formed by the hypergolic fuel grains.

10. The apparatus of claim 9, wherein the hypergolic fuel grains are configured to generate the flame to ignite the second rocket motor when the pressurized oxidizer contacts the hypergolic fuel grains.

11. The apparatus of claim 10, wherein, when the valve is closed, the pressurized oxidizer is prevented from contacting the hypergolic fuel grains such that the flame of the first rocket motor is extinguished.

12. A hybrid rocket motor, comprising:
hypergolic fuel grains configured to form a first chamber configured to receive pressurized oxidizer and connected to a first inlet of a pre-combustion chamber of a larger rocket motor; and
an injector configured to inject the pressurized oxidizer through a second net of the pre-combustion chamber,
wherein the hypergolic fuel grains are configured to ignite the larger rocket motor when the pressurized oxidizer is released into the first chamber formed by the hypergolic fuel grains to generate a flame in the pre-combustion chamber and by mixing the flame with the pressurized oxidizer injected by the injector through the second inlet, and
the hypergolic fuel grains are extinguished from burning when the pressurized oxidizer is prevented from being released into the first chamber formed by the hypergolic fuel grains.

13. The apparatus of claim 12, further comprising:
pressurized oxidizer storage comprising the pressurized oxidizer,
wherein the pressurized oxidizer comprises one or more of nitric acid, hydrochloric acid, sulfuric acid, red fuming nitric acid, or inhibited red fuming nitric acid.

14. The apparatus of claim 12, further comprising:
a valve configured to allow the pressurized oxidizer to be released into the first chamber.

15. The apparatus of claim 14, wherein, when the valve is open, the pressurized oxidizer is released into the first chamber, and upon contact with the hypergolic fuel grains, the hypergolic fuel grains produce the flame in the pre-combustion chamber of the larger rocket motor to ignite the larger rocket motor.

16. The apparatus of claim 15, wherein, when the valve is closed after a predetermined period of time, the pressurized oxidizer is prevented from contacting the hypergolic fuel grains such that the flame is extinguished.

17. The apparatus of claim 12, wherein the hypergolic fuel grains comprise paraffin wax comprising one or more of the following: lithium aluminum hydride or metal hydrides, triethyl aluminum, disobutyl aluminum hydride, sodium bis aluminum hydride, and triethyl borane.

18. The apparatus of claim 12, wherein the hypergolic fuel grains comprise low density polyethylene with one or more of the following: lithium aluminum hydride or metal hydrides, triethyl aluminum, disobutyl aluminum hydride, sodium bis aluminum hydride, and triethyl borane.

* * * * *